US012654041B2

(12) United States Patent
Williams et al.

(10) Patent No.: US 12,654,041 B2
(45) **Date of Patent: *Jun. 16, 2026**

(54) RESPIRATOR

(71) Applicant: Milwaukee Electric Tool Corporation, Brookfield, WI (US)

(72) Inventors: Aaron M. Williams, Milwaukee, WI (US); Jason D. Thurner, Menomonee Falls, WI (US); Grant T. Squiers, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 258 days.

This patent is subject to a terminal disclaimer.

(21) Appl. No.: 18/503,655

(22) Filed: Nov. 7, 2023

(65) Prior Publication Data

US 2024/0066330 A1 Feb. 29, 2024

Related U.S. Application Data

(63) Continuation of application No. 18/167,568, filed on Feb. 10, 2023, now Pat. No. 11,844,967, which is a
(Continued)

(51) Int. Cl.
*A62B 7/10* (2006.01)
*A62B 9/04* (2006.01)
(Continued)

(52) U.S. Cl.
CPC .................. *A62B 7/10* (2013.01); *A62B 9/04* (2013.01); *A62B 18/10* (2013.01); *A62B 23/02* (2013.01)

(58) Field of Classification Search
CPC .... A62B 7/10; A62B 7/00; A62B 7/02; A62B 7/04; A62B 9/04; A62B 9/00; A62B 9/02; A62B 9/06; A62B 23/02; A62B 23/025; A41D 13/11; A41D 13/1107; A41D 13/1138; A41D 13/1146; A41D 13/1161; A41D 13/1169; A41D 13/1176;
(Continued)

(56) References Cited

U.S. PATENT DOCUMENTS 3,688,768 A 9/1972 Manville
3,757,777 A 9/1973 Kaufman
(Continued)

FOREIGN PATENT DOCUMENTS

CN 101432039 5/2009
DE 2717968 12/1977
(Continued)

OTHER PUBLICATIONS

International Search Report and Written Opinion for PCT/2019/044206 dated Nov. 14, 2019, 11 pages.

*Primary Examiner* — Kendra D Carter
*Assistant Examiner* — Brian T Khong
(74) *Attorney, Agent, or Firm* — Reinhart Boerner Van Deuren s.c.

(57) ABSTRACT

A tool, such as a respirator, including a body, an opening defined by the body, a door coupled to the body, and a filter positioned between the body and the filter. The door actuates between open and closed positions. The filter can be removed and replaced when the door is in the open position.

18 Claims, 5 Drawing Sheets

Related U.S. Application Data continuation of application No. 16/539,763, filed on Aug. 13, 2019, now Pat. No. 11,583,707, which is a continuation of application No. PCT/US2019/044206, filed on Jul. 30, 2019.

(60) Provisional application No. 62/712,325, filed on Jul. 31, 2018.

(51) Int. Cl.
*A62B 18/10* (2006.01)
*A62B 23/02* (2006.01)

(58) Field of Classification Search
CPC ........... B01D 46/0005; B01D 46/0015; A61M 16/0611; A61M 16/06; A61M 16/0605; A61M 16/20; A61M 16/201; A61M 16/208
See application file for complete search history.

(56) References Cited

U.S. PATENT DOCUMENTS

| | | | | |
|---|---|---|---|---|
| 3,786,126 | A | 1/1974 | Manville | |
| 4,319,567 | A | 3/1982 | Magidson | |
| 5,701,893 | A | 12/1997 | Kern et al. | |
| 5,706,803 | A | 1/1998 | Bayer | |
| 5,735,270 | A | 4/1998 | Bayer | |
| 6,173,712 | B1 | 1/2001 | Brunson | |
| 6,257,235 | B1 | 7/2001 | Bowen | |
| 6,412,486 | B1 | 7/2002 | Glass | |
| 6,526,975 | B1 | 3/2003 | Chung | |
| 6,718,981 | B2 | 4/2004 | Cardarelli | |
| 6,817,362 | B2 | 11/2004 | Gelinas et al. | |
| 8,365,734 | B1 | 2/2013 | Lehman | |
| 8,960,195 | B2 | 2/2015 | Lehman | |
| 9,399,106 | B2 | 7/2016 | Borody et al. | |
| 9,408,424 | B2 | 8/2016 | Noh et al. | |
| 9,579,540 | B1 * | 2/2017 | Danford | A63B 21/0085 |
| 2003/0029454 | A1 * | 2/2003 | Gelinas | A62B 18/025 128/205.27 |
| 2003/0154984 | A1 | 8/2003 | Fernandes | |
| 2004/0231023 | A1 | 11/2004 | Huang | |
| 2005/0005940 | A1 * | 1/2005 | Gunaratnam | A61M 16/0622 128/207.11 |
| 2005/0194010 | A1 | 9/2005 | Sankot | |
| 2007/0251522 | A1 | 11/2007 | Welchel et al. | |
| 2008/0110465 | A1 | 5/2008 | Welchel et al. | |
| 2008/0110469 | A1 | 5/2008 | Weinberg | |
| 2009/0250060 | A1 | 10/2009 | Hacke et al. | |
| 2009/0277451 | A1 | 11/2009 | Weinberg | |
| 2010/0132714 | A1 | 6/2010 | Morelli et al. | |
| 2010/0224199 | A1 | 9/2010 | Smith et al. | |
| 2011/0155140 | A1 | 6/2011 | Ho et al. | |
| 2014/0069434 | A1 * | 3/2014 | Neff | A61M 16/0622 29/428 |
| 2014/0150799 | A1 | 6/2014 | Daly | |
| 2015/0352309 | A1 | 12/2015 | Daly | |
| 2016/0001101 | A1 | 1/2016 | Sabolis et al. | |
| 2016/0332008 | A1 | 11/2016 | Mcandrews | |
| 2016/0361510 | A1 | 12/2016 | Alphonse | |
| 2017/0007861 | A1 | 1/2017 | Parham et al. | |
| 2017/0050057 | A1 | 2/2017 | Sabolis et al. | |
| 2017/0065838 | A1 | 3/2017 | Bunge et al. | |

FOREIGN PATENT DOCUMENTS

| | | |
|---|---|---|
| DE | 2938720 | 5/1982 |
| EP | 0085746 | 9/1988 |
| EP | 0414956 | 3/1991 |
| EP | 2799116 | 11/2014 |
| KR | 10-2009-0117678 | 11/2009 |
| KR | 10-1083435 | 11/2009 |
| KR | 10-2010-0064396 | 6/2010 |
| WO | WO00-50122 | 8/2000 |
| WO | WO08129575 | 10/2008 |
| WO | WO12089963 | 7/2012 |
| WO | WO12089964 | 7/2012 |

* cited by examiner

RESPIRATOR

CROSS-REFERENCE TO RELATED APPLICATIONS

This application is a continuation of U.S. application Ser. No. 18/167,568, filed Feb. 10, 2023, which is a continuation of U.S. application Ser. No. 16/539,763, filed Aug. 13, 2019, which issued as U.S. Pat. No. 11,583,707 on Feb. 21, 2023, which is a continuation of International Application No. PCT/US2019/044206, filed Jul. 30, 2019, which claims the benefit of and priority to U.S. Provisional Application No. 62/712,325, filed Jul. 31, 2018, which are incorporated herein by reference in their entireties.

BACKGROUND OF THE INVENTION

The present disclosure relates to respirators that protect a user from breathing dust and other debris.

SUMMARY OF THE INVENTION

One embodiment of the disclosure includes a respirator with body, a gasket, a first opening defined by the body, a door coupled to the body, a filter, and an exhaust valve. The gasket is coupled to the body and facilitates a seal with a user's face. An internal airspace is defined between the respirator and the user's face. The door actuates between an open position and a closed position and defines a second opening that is aligned with the first opening when the door is in the closed position. The filter is positioned between the door and the body when the door is in the closed position. The filter, the door and the body cooperatively restrict air from transiting the first opening without also transiting the filter. The exhaust valve is coupled to the body. Air is permitted to flow through the exhaust valve in a first direction, which exits the internal airspace.

In another embodiment a respirator includes a body, an opening defined by the body, a door coupled to the body, a filter, an exhaust valve, and an intake valve. The respirator body and the user's face collectively define an internal airspace. The door is configured to actuate between an open position and a closed position. The filter is positioned between the door and the body when the door is in the closed position. The filter, the door and the body cooperatively restrict air from transiting the first opening without also transiting the filter. Air is permitted to flow through the exhaust in a first direction that exits the internal airspace, and air is permitted to flow through the intake valve in a second direction, which enters the internal airspace.

In another embodiment a respirator includes a body, a gasket, an opening defined by the body, a door pivotally coupled to the body, a filter, and an exhaust valve. The gasket is coupled to the body. The gasket is configured to facilitate a seal with a user's face to define an internal airspace between the body and the user's face. The door is configured to actuate between an open position and a closed position. The filter is positioned between the door and the body when the door is in the closed position, and the filter, the door and the body cooperatively restrict air from transiting the first opening without also transiting the filter. The exhaust valve is rotatably coupled to the body. Air is permitted to flow through the exhaust valve in a first direction that exits the internal airspace.

In one embodiment, a mask includes a body that has a sealing member, a central opening, and a strap. The strap is configured to fit around a user's head and compress the sealing member against a user's face. The mask also includes a door coupled to the body and moveable between a first position and a second position. In the first position, the door is fixed relative to the body. In the second position, the door is moveable relative to the body. The door includes a door opening that is aligned with the central opening when the door is in the first position. The door is configured to seal a filter between the body and the door when the door is in the first position.

In another embodiment, a respirator includes a mask having a body with a sealing member, a central opening, and a strap. The strap is configured to fit around a user's head and compress the sealing member against a user's face. The mask also includes a door moveable between a first position and a second position. In the first position, the door is fixed relative to the body. In the second position, the door is moveable relative to the body. The door includes a door opening that is aligned with the central opening when the door is in the first position. The respirator also includes a filter that is removably positionable between the body and the door adjacent the door opening and the central opening.

In yet another embodiment, a mask includes a body that has a central opening. The central opening extends through an entire thickness of the body. The mask also includes a door, having a door opening, that is moveable between a first position and a second position. In the first position, the door is fixed relative to the body and the door opening is substantially aligned with the central opening. In the second position, the door is pivotable relative to the body so that the door opening is not aligned with the central opening. The door is configured to seal a filter between the body and the door when the door is in the first position.

In yet another embodiment, a mask includes a body that has a central opening. The central opening extends through an entire thickness of the body. The mask also includes a door that is moveable between a first position and a second position. In the first position, the door is fixed relative to the body, and in the second position, the door is pivotable relative to the body so that the door opening is not aligned with the central opening. The mask also includes a cover that is attachable to the door for securing a filter pad to the door.

In still another embodiment, a mask includes a body that has a central opening. The mask also includes a door, having a first one-way respiration valve, that is moveable between a first position and a second position. A second one-way respiration valve is disposed on the body and is moveable relative to the body in order to direct exhaled air away from the mask in a user-selectable direction.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a respirator are described. Respirators are commonly used in environments with dirty or polluted air to clean air before being breathed in by a user.

In one embodiment, a respirator includes a door coupled to the body of the respirator. The door and the body define openings that are aligned with each other. A filter is positioned between the door and the body. As the respirator is used, the filter becomes increasingly dirty as it absorbs particulates and other objects. To facilitate the replacement of the filter the door actuates between open and closed positions, thus facilitating the filter being quickly and easily replaced.

In another embodiment, a respirator includes a body, an opening defined by the body, a door coupled to the body, a filter positioned between the door and the body when the door is in a closed position, an exhaust valve, and an intake valve coupled to the door. Coupling the intake valve to the door, which in various embodiments is centrally positioned, provides a more direct route for air to ingress into the respirator for the user to breath.

In another embodiment, a respirator includes a body, a gasket coupled to the body, an opening defined by the body, a door pivotally coupled to the body, a filter positioned between the door and the body when the door is in a closed position, and an exhaust valve rotatably coupled to the body. The ability to rotate the exhaust valve provides the user to aim the flow of air being exhausted from the respirator to reduce back pressure from exhaled air trying to egress the respirator. In a more specific embodiment the respirator includes two respirators that are independently rotatable.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
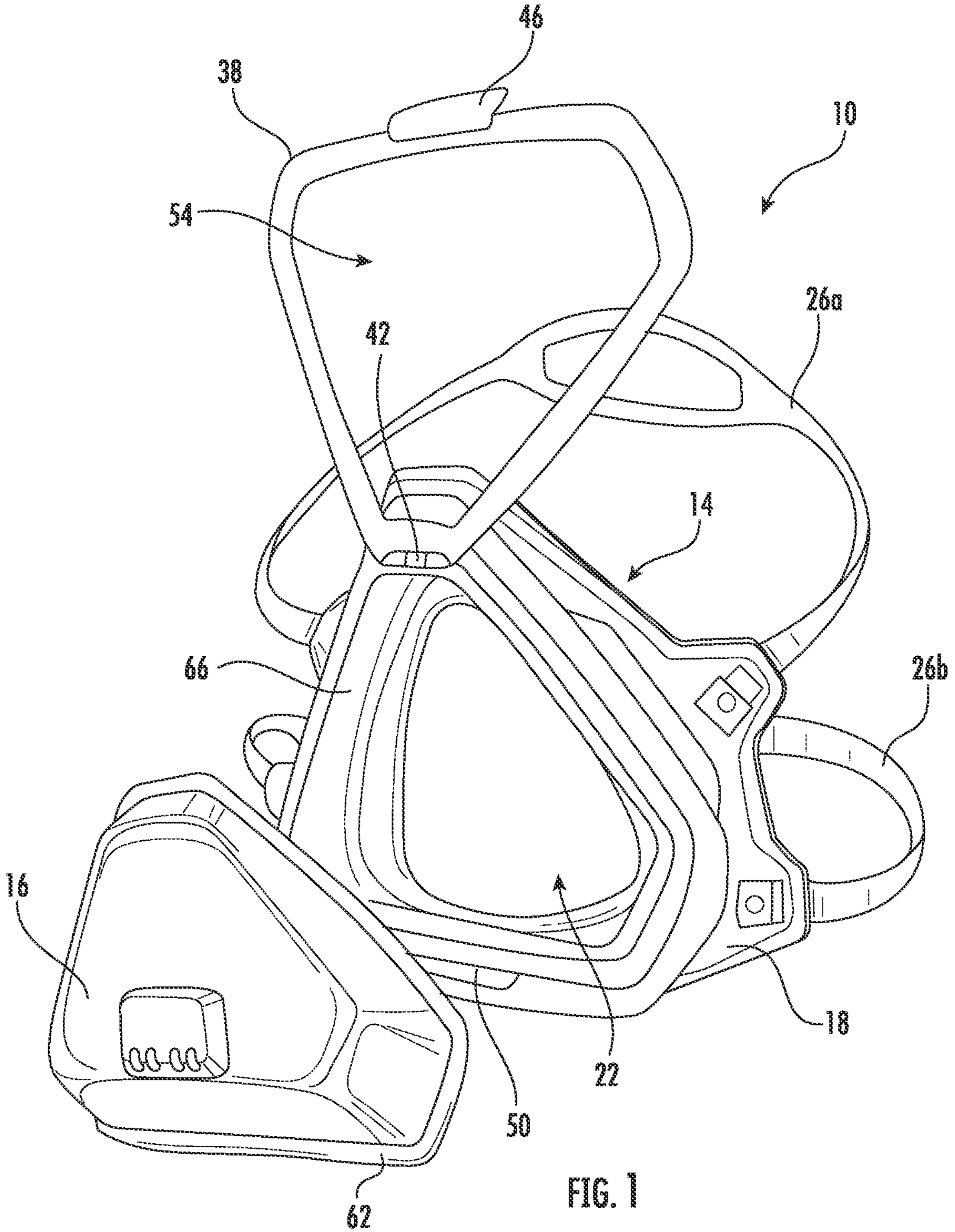
FIG. 1 is an exploded perspective view of a respirator in accordance with an embodiment of the invention, illustrating a mask and a removable filter.

As shown in FIG. 1, a respirator 10 includes a mask 14 with a separate filter 16, which allows the filter 16 to be replaced without replacing the mask 14. The mask 14 includes a body 18 having a generally triangular profile and a thickness. In the illustrated embodiment, the body 18 includes a central opening 22 that extends through the thickness of the body 18. The opening 22 has a width less than an overall width of the body 18, but has a similarly shaped (generally triangular) profile as the body 18.

The mask 14 also includes upper and lower straps **26*a*, 26*b* coupled to the periphery of the body 18 for securing the mask 14 to a user's head. The straps 26*a*, 26*b* may be made from an elastic and/or flexible material to accommodate variations in user's head sizes and shape. In the illustrated embodiment, the lower strap 26*b* includes a clasp 30 (FIG. 2), which allows the length of the lower strap 26*b*** to be adjusted based on the size of the user's head.

Figure 2:
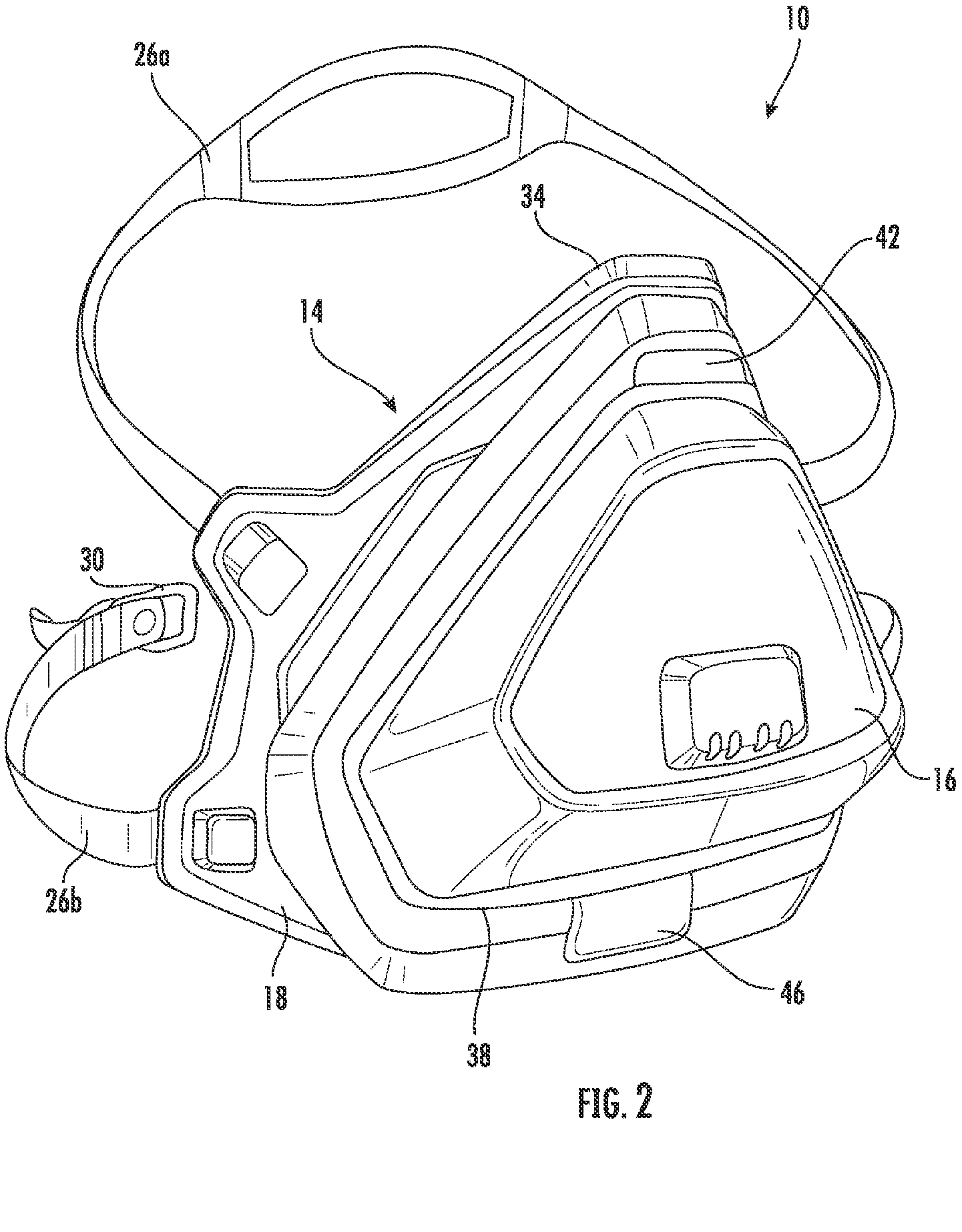
FIG. 2 is an assembled perspective view of the respirator of FIG. 1.

With continued reference to FIG. 2, the mask 14 also includes a sealing member or gasket 34 disposed on the same side of the body 18 from which the straps 26 extend. In the illustrated embodiment, the gasket 34 extends along the entire perimeter of the body 18 to form a seal around the user's mouth and nose.

With reference to FIG. 1, the mask 14 further includes a door 38 coupled to the body 18 on an opposite side as the gasket 34. In the illustrated embodiment, the door 38 is pivotably coupled to the body 18 by a hinge 42 that permits the door 38 to pivot approximately 180 degrees relative to the body 18. The door 38 also includes a latch 46 that mates with a recess 50 in the body 18 to secure the door 38 in a closed position on the body 18 as shown in FIG. 2.

In one embodiment hinge 42 is located above door 38 to permit door 38 pivoting upward. In various other embodiments hinge 42 hinge is located on a side of door 38 and below door 38.

In the illustrated embodiment, the door 38 includes a door opening 54 that is substantially the same size and shape as the body opening 22. The door opening 54 is aligned with the body opening 22 when the door 38 is latched in the closed position shown in FIG. 2.

In the illustrated embodiment, the filter 16 has a substantially similar profile as the body opening 22 and the door opening 54. The filter 16 has a flange 62 along its perimeter, and is tapered toward its center. The filter 16 may be specifically shaped to fit the particular shape of the body opening 22 and the door opening 54. Alternatively, the body opening 22 and door opening 54 may be specifically shaped to accommodate standard size and shape disposable paper filters.

To use the respirator 10, a user positions the mask 14 against their head. The gasket 34 is positioned against the user's face to thereby seal their nose and mouth defining an internal airspace between the user's face and mask 14, and the straps **26*a*, 26*b* are positioned around on the back of the user's head. The straps 26*a*, 26*b* may be repositioned on the user's head as desired and specifically, the lower strap 26*b* may be tightened or loosened to ensure the gasket 34 is sealed against the user's face. The straps 26*a*, 26*b* are adjustable and repositionable to provide user comfort as well as to compress the gasket 34 between the user's face and the body 18** to create a tight seal with the user's face to prevent debris ingress from reaching the user's mouth or nose.

If the door 38 is initially in its closed position, the user may then release the latch 46 from the recess 50 in order to pivot the door 38 from the closed position (FIG. 2) to an open position where the door opening 54 is misaligned with the body opening 22. Then, the user inserts the filter 16 within the body opening 22, resting the flange 62 against a corresponding flange 66 on the body 18 that surrounds the body opening 22 (FIG. 1).

As shown in FIG. 2, the door 38 is then returned to the closed position where the latch 46 is again received in the recess 50. In the closed position of the door 38, the filter 16 protrudes through the door opening 54. And, the door 38 engages the flange 62 (FIG. 1) of the filter 16 to clamp the flange 62 against the corresponding flange 66 of the body 18, thereby creating a seal between the filter 16 and the body 18 to prevent debris ingress through the body opening 22. The clamping force exerted on the flange 62 also prevents the filter 16 from being removed from the mask 14. The thickness of the body 18 also spaces the filter 16 apart from the user's mouth and nose while wearing the mask 14. As the user breathes, air may only pass through the filter 16 to reach the user's mouth and nose. The interface between filter 16, door 38, and body 18 cooperatively restrict air from transiting opening 22 without transiting filter 16.

When the filter 16 becomes dirty, the user can pivot the door 38 to the open position (FIG. 1), remove the filter 16 from the body opening 22, and replace the dirty filter 16 with a clean replacement filter 16 using the same procedure described above. During use, the user may wish to access their mouth or nose while wearing the mask 14. The door 38 allows the user to access their face without breaking the seal between the mask 14 and their face.

Figure 3:
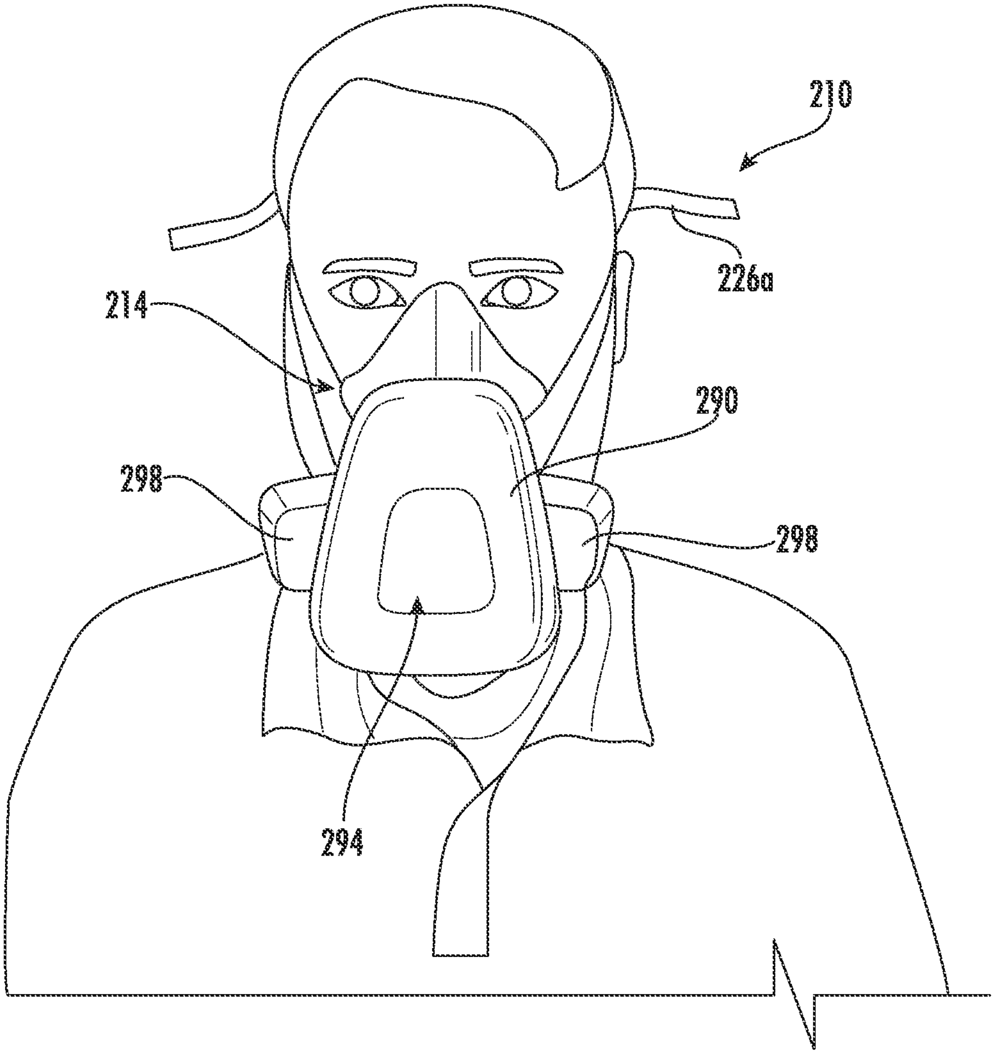
FIG. 3 is a perspective view of a respirator in accordance with another embodiment of the invention.
Figure 4:
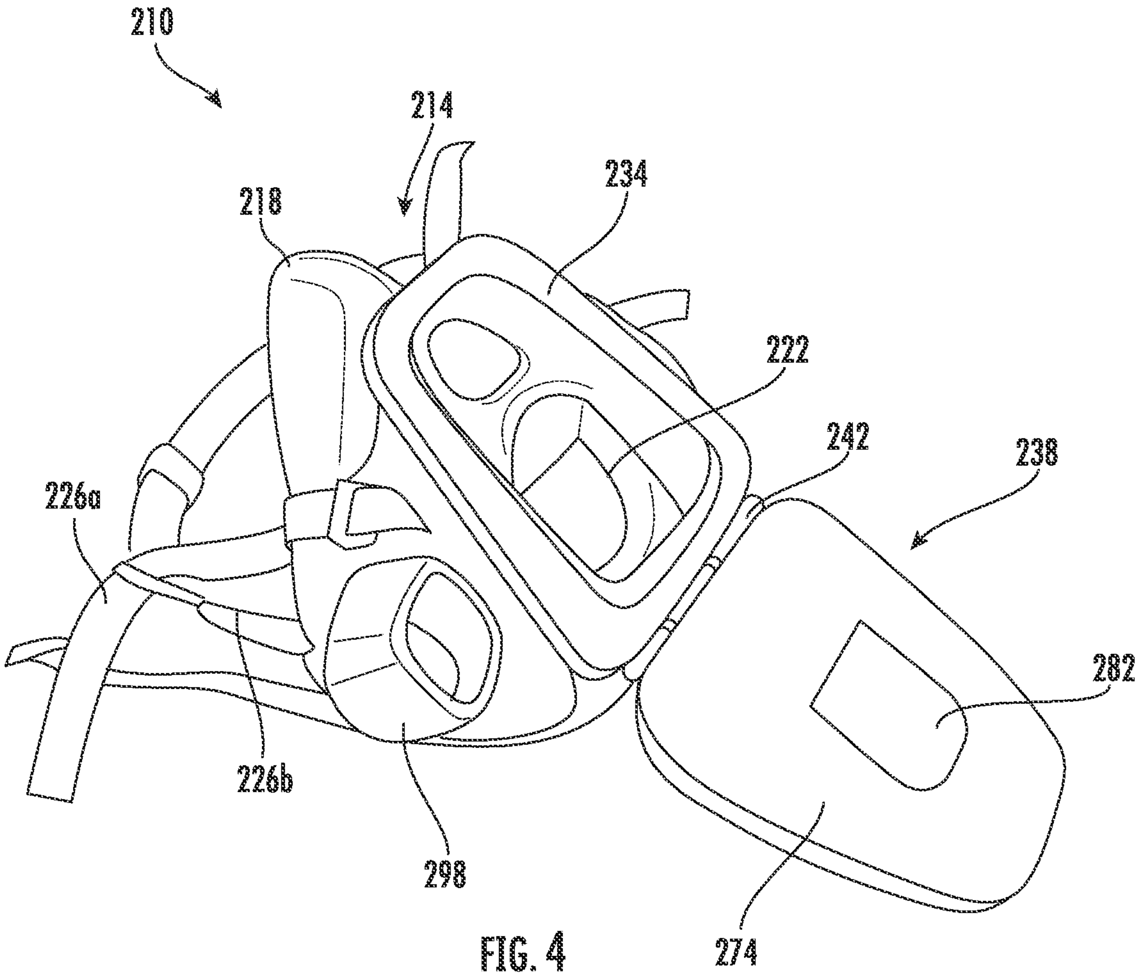
FIG. 4 is a perspective view of the respirator of FIG. 3, with a door pivoted to an open position.
Figure 5:
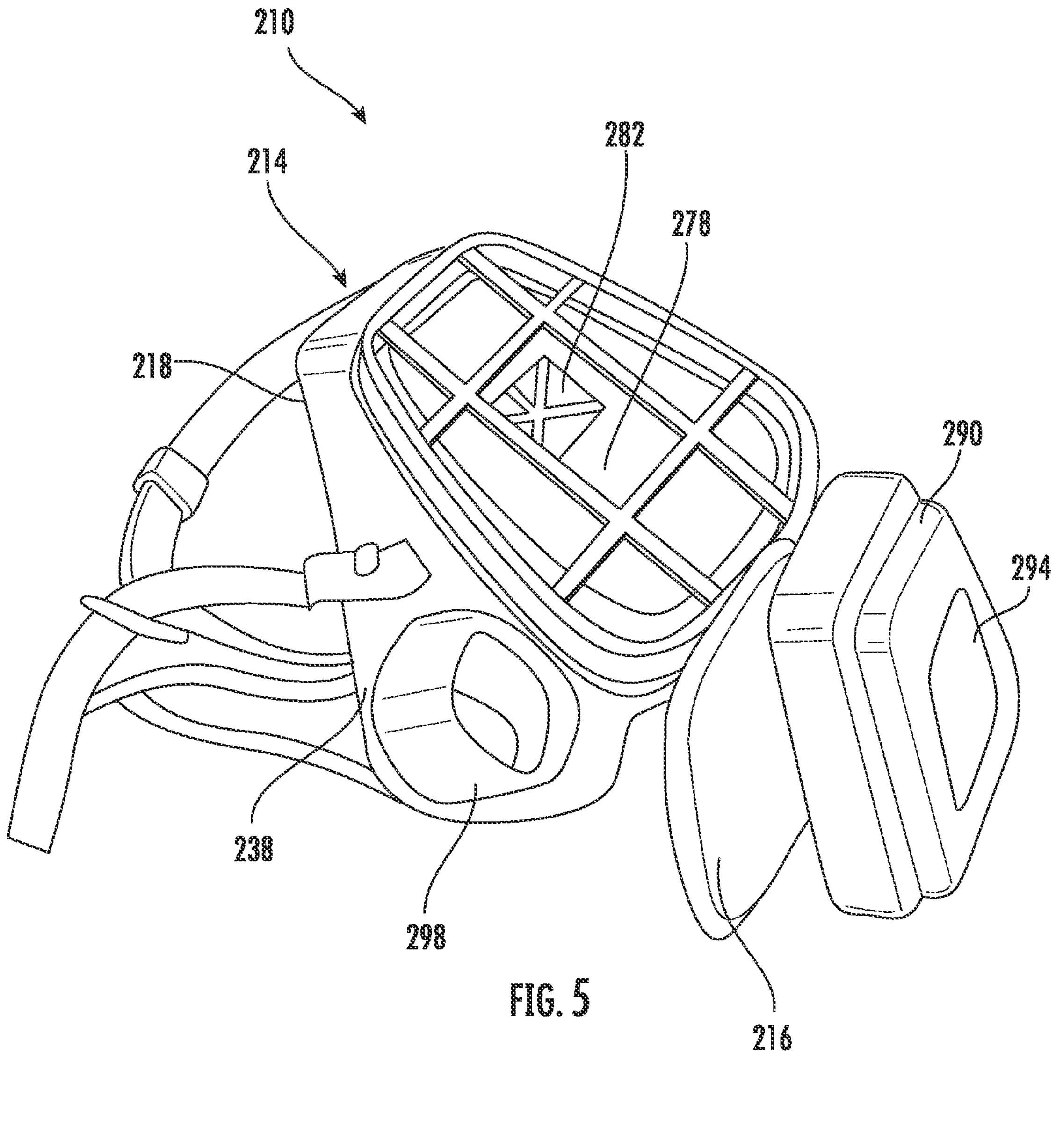
FIG. 5 is an exploded view of the respirator of FIG. 3, illustrating a removable filter pad and cover.

FIGS. 3-5 illustrate another embodiment of a respirator 210 that is similar to the respirator 10. Common elements include the same reference number, plus "200".

As shown in FIGS. 3 and 4, another embodiment of a respirator 210 includes a mask 214 with a separate filter pad 216, which allows the filter pad 216 to be replaced without replacing the mask 214. The mask 214 includes a body 218 having a generally triangular profile and a thickness. In the illustrated embodiment, the body 218 includes a central opening 222 that extends through the thickness of the body 218.

The mask 214 further includes a door 238 coupled to the body 218. In the illustrated embodiment, the door 238 is pivotably coupled to the body 218 by a hinge 242 that permits the door 238 to pivot from a first or closed position (FIG. 3), to a second or open position (FIG. 4) approximately 180 degrees relative to the body 218. The door 238 is configured to pivot downwardly (i.e., toward the user's chin) from the first position to the second position. The mask 214 also includes a sealing member or gasket 234 disposed on the same side of the body 218 as the door 238. In the illustrated embodiment, the door 238 is pressed against the gasket 234 in the closed position to thereby provide a seal between the door 238 and the body 218.

The door 238 also includes a first or inner side 274 proximate the user's face and a second or outer side 278 (FIG. 5) opposite the inner side 274. The inner side 274 includes an intake valve 282 to provide one-way respiration (i.e., inhaling) therethrough. In the illustrated embodiment, the intake valve 282 is affixed to the door 238 for movement therewith.

With continued reference to FIG. 5, the filter pad 216 is positioned adjacent the outer side 278. The mask 214 also includes a translucent cover 290 that is attachable to the outer side 278 of the door 238 to secure the filter pad 216 to the door 238. The cover 290 includes an opening 294 that allows air to pass through the cover 290, the filter pad 216, and the intake valve 282 before reaching the user's mouth and nose. The filter pad 216 removes debris entrained within the air, permitting only filtered air to pass through the intake valve 282 to reach the user's mouth and nose. As debris accumulates on the filter pad 216, it may become discolored, which the user can see through the translucent cover 290. The user may then replace the filter pad 216 by removing and subsequently reattaching the cover 290 to the door 238.

Because the intake valve 282 is integrated with the door 238 (and is thus non-disposable), replacement costs of the filter pads 216 may be reduced.

In the closed position of the door 238, as the user inhales, air is filtered by the filter pad 216. As the user exhales, air exits the mask 214 through exhaust valves 298 positioned, respectively, on opposite sides of the body 218 (FIG. 3). Like the intake valve 282, the exhaust valves 298 provide one-way respiration (i.e., exhaling) therethrough. In the illustrated embodiment, an exhaust valve 298 is disposed on either side of the door 238. The exhaust valves 298 are independently rotatable relative to the body 218, which allows the user to direct exhaled air from the mask 214 in user-selectable directions. This, for example, mitigates fogging of glasses or safety goggles while the respirator 210 is in use. After using the respirator 210, the user can replace the filter pad 216 with a new filter pad 216 and continue to use the respirator 210. Pivoting the door 238 to the open position also allows a user to access their nose or mouth without removing the mask 214.

In various embodiments one or more valves, shown as exhaust valve 298, permit air to exit the internal airspace between the respirator and the user's face, and one or more valves, shown as intake valve 282, permit air to enter the internal airspace between the respirator and the user's face. In one or more embodiments exhaust valve 298 and intake valve 282 permit a unidirectional flow of air.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A respirator comprising:

a body having a first side and a second side opposite the first side, the first side configured to engage a user's face, an internal airspace defined between the first side of the body and the second side of the body;

an opening defined by the body;

a door coupled to the second side of the body, the door movable between an open position and a closed position;

a filter positioned between the door and the second side of body when the door is in the closed position, wherein the filter, the door, and the body cooperatively restrict air from transiting the opening without also transiting the filter; and an exhaust valve coupled to the body, the exhaust valve configured to allow air to exit the internal airspace in a first direction, wherein the exhaust valve is rotatably coupled to the body.

2. The respirator of claim 1, further comprising a gasket positioned between the door and the second side of the body, the gasket configured to facilitate a seal between the door and the body.

3. The respirator of claim 1, further comprising an intake valve coupled to the body, the intake valve configured to allow air to enter the internal airspace in a second direction, opposite from the first direction.

4. The respirator of claim 3, wherein the intake valve is located between the door and the second side of the body.

5. The respirator of claim 1, wherein the opening is a first opening and the door defines a second opening, wherein the filter protrudes through the second opening.

6. The respirator of claim 1, wherein the exhaust valve is a first exhaust valve, the respirator further comprising:

a second exhaust valve coupled to the body, air being permitted to flow through the second exhaust valve in the first direction that leaves the internal airspace.

7. The respirator of claim 6, wherein the first exhaust valve and the second exhaust valve rotate with respect to the body.

8. The respirator of claim 7, wherein the first exhaust valve and the second exhaust valve are independently rotatable and are configured to permit the user to direct exhaled air in user-selectable directions.

9. A respirator comprising:

a body that is configured to define an internal airspace between the body and a user's face;

a first opening defined by the body;

a door coupled to the body, the door pivotally configured to actuate between an open position and a closed position, the door defining a second opening that is aligned with the first opening when the door is in the closed position, wherein a top portion of the door is pivotally coupled to the body such that the door pivots up towards a nose portion of the body when the door pivots from the open position to the closed position, the nose portion of the body configured to interface against a nose of the user's face;

a filter detachably coupled to the door and the body such that the filter, the door and the body cooperatively restrict air from transiting the first opening without also transiting the filter; and an exhaust valve coupled to the body, air being permitted to flow through the exhaust valve in a first direction that exits the internal airspace;

wherein the exhaust valve is rotatably coupled to the body.

10. The respirator of claim 9, further comprising:

a latch coupled to a bottom portion of the door; and a recess defined in the body, the recess located opposite from the nose portion of the body, wherein the latch mates with the recess to secure the door in the closed position.

11. The respirator of claim 9, wherein the exhaust valve is a first exhaust valve, the respirator comprising:

a second exhaust valve coupled to the body, air being permitted to flow through the second exhaust valve in the first direction that leaves the internal airspace.

12. The respirator of claim 11, wherein the first exhaust valve and the second exhaust valve are independently rotatable with respect to the body and are configured to permit the user to direct exhaled air in user-selectable directions.

13. The respirator of claim 9, comprising a gasket coupled to the body, the gasket configured to facilitate a seal with the user's face to define the internal airspace between the body and the user's face.

14. The respirator of claim 9, wherein the body comprises a first flange that defines the first opening, wherein the filter comprises a second flange that peripherally surrounds the filter, and wherein the first flange and the second flange interface against each other when the door is in the closed position.

15. A respirator comprising:

a body that is configured to define an internal airspace between the body and a user's face;

a first opening defined by the body;

a door coupled to the body, the door pivotally configured to actuate between an open position and a closed position, wherein a top portion of the door is pivotally coupled to the body such that the door pivots up towards a nose portion of the body when the door pivots from the open position to the closed position, the nose portion of the body configured to interface against a nose of the user's face;

a filter detachably coupled to the door and the body such that the filter, the door and the body cooperatively restrict air from transiting the first opening without also transiting the filter;

an exhaust valve coupled to the body, air being permitted to flow through the exhaust valve in a first direction that exits the internal airspace; and an intake valve coupled to the door, air being permitted to flow through the intake valve in a second direction that enters the internal airspace;

wherein the exhaust valve is rotatably coupled to the body.

16. The respirator of claim 15, comprising a gasket coupled to the body, the gasket configured to facilitate a seal with the user's face to define the internal airspace between the body and the user's face.

17. The respirator of claim 15, wherein the exhaust valve is a first exhaust valve, the respirator comprising:

a second exhaust valve coupled to the body, air being permitted to flow through the second exhaust valve in the first direction that leaves the internal airspace.

18. The respirator of claim 17, wherein the first exhaust valve and the second exhaust valve are independently rotatable with respect to the body and are configured to permit the user to direct exhaled air in user-selectable directions.

* * * * *